IDENTIFIER-RECORDER

Filed Aug. 6, 1956 3 Sheets-Sheet 1

INVENTOR
F. M. PEARSALL, JR.
BY
SE Hollander
ATTORNEY

June 2, 1959 F. M. PEARSALL, JR 2,889,402

IDENTIFIER-RECORDER

Filed Aug. 6, 1956 3 Sheets-Sheet 2

INVENTOR
F. M. PEARSALL, JR.
BY SE Hollander
ATTORNEY

June 2, 1959 F. M. PEARSALL, JR 2,889,402

IDENTIFIER-RECORDER

Filed Aug. 6, 1956 3 Sheets-Sheet 3

INVENTOR
F. M. PEARSALL, JR.
BY S E Hollander
ATTORNEY

United States Patent Office 2,889,402
Patented June 2, 1959

2,889,402

IDENTIFIER-RECORDER

Frank M. Pearsall, Jr., Merrick, N.Y., assignor to Bell Telephone Laboratories, Incorporated, New York, N.Y., a corporation of New York Application August 6, 1956, Serial No. 602,103
13 Claims. (Cl. 179—5.5)

This invention relates to an emergency reporting alarm system and more specifically to a call recorder for automatically printing a record which will identify a police or fire box or other source originating an emergency service request together with the time such request is initiated.

In certain known emergency reporting systems, it is mandatory for the individual originating a service request to verbally identify the location from which the request is made or the location at which help is required. Since, in many instances, it may be difficult for a person who is requesting an emergency service to lucidly communicate information essential to the proper dispatch of servicemen or equipment, it is possible that the desired aid may be delayed or impeded.

Moreover, in the event of widespread catastrophe it is conceivable that a great number of emergency service requests may be made simultaneously, thereby enhancing the difficulty of achieving an accurate compilation of requests for aid.

It is therefore an object of this invention to provide for the processing of many simultaneous requests, in sequence, whereby a call which has been identified and recorded once, cannot be reprocessed, while other calls are awaiting service until at least one other call has been serviced.

Another object of this invention is to accomplish accurate and reliable recordation of requests for emergency aid.

A further object is to effect simple and economical identification of telephone lines requesting emergency service.

Still another object of this invention is to prevent protracted usage of recordation equipment by a faulted telephone line or one to which no response has been made.

A feature of this invention is a crossbar switch identifier equipped for concurrent processing of a maximum of ten separate service requests.

These and other objects and features of this invention may be more readily understood from an examination of the accompanying specification, appended claims and attached drawings in which:

*General description*

Each police or fire headquarters or other emergency installation included within the emergency reporting alarm system will include a call recorder circuit in accordance with the invention. The call recorder comprises three chief components, namely, a line identifier, time-of-day circuit, and a message printer or ticketer with control circuit therefor.

In essence, the function of the device is as follows: When a request is originated at a police or fire alarm box or other equivalent source, a signal is transmitted to the line identifier portion of the circuit through a relay in the line cricuit associated with the box. This call indication operates a select magnet on a crossbar switch through an intermediate relay. Subsequently, a hold magnet of the crossbar switch operates to close a particular crosspoint identifying the location whence the request originated. This crosspoint remains operated and a ticket including all pertinent information concerning the call will be ultimately printed whether or not the call is abandoned before being verbally answered at police or fire headquarters.

If no other calls in the switch are awaiting processing and if the system includes only a single crossbar switch, the call is prepared for transfer to the message ticketer control circuit. Subsequently, if no calls are being processed in other switches (where a plurality of identifiers are employed) the call is connected to the message ticketer control. Through control leads between the message ticketer control, the crossbar switch and the message ticketer, a ticket is printed identifying the location at which the request originated. At this time the message ticketer control releases the identifier switch crosspoint and connects to a time-of-day circuit for printing a record of the month, day, hour, minutes, and tenths of minutes.

Upon completion of recordation of the time-of-day information, the ticketer may or may not cut the ticket depending on whether one or two calls per ticket are desired, as controlled by an optional circuit arrangement. It is also possible to print a second or more tickets for the same call if the call has not been answered at the time the call identity record is made. However, the second ticket, if produced, will be delayed until the completion of at least one other call waiting in the same switch (where only one switch is used), if such call exists.

Figure 1:
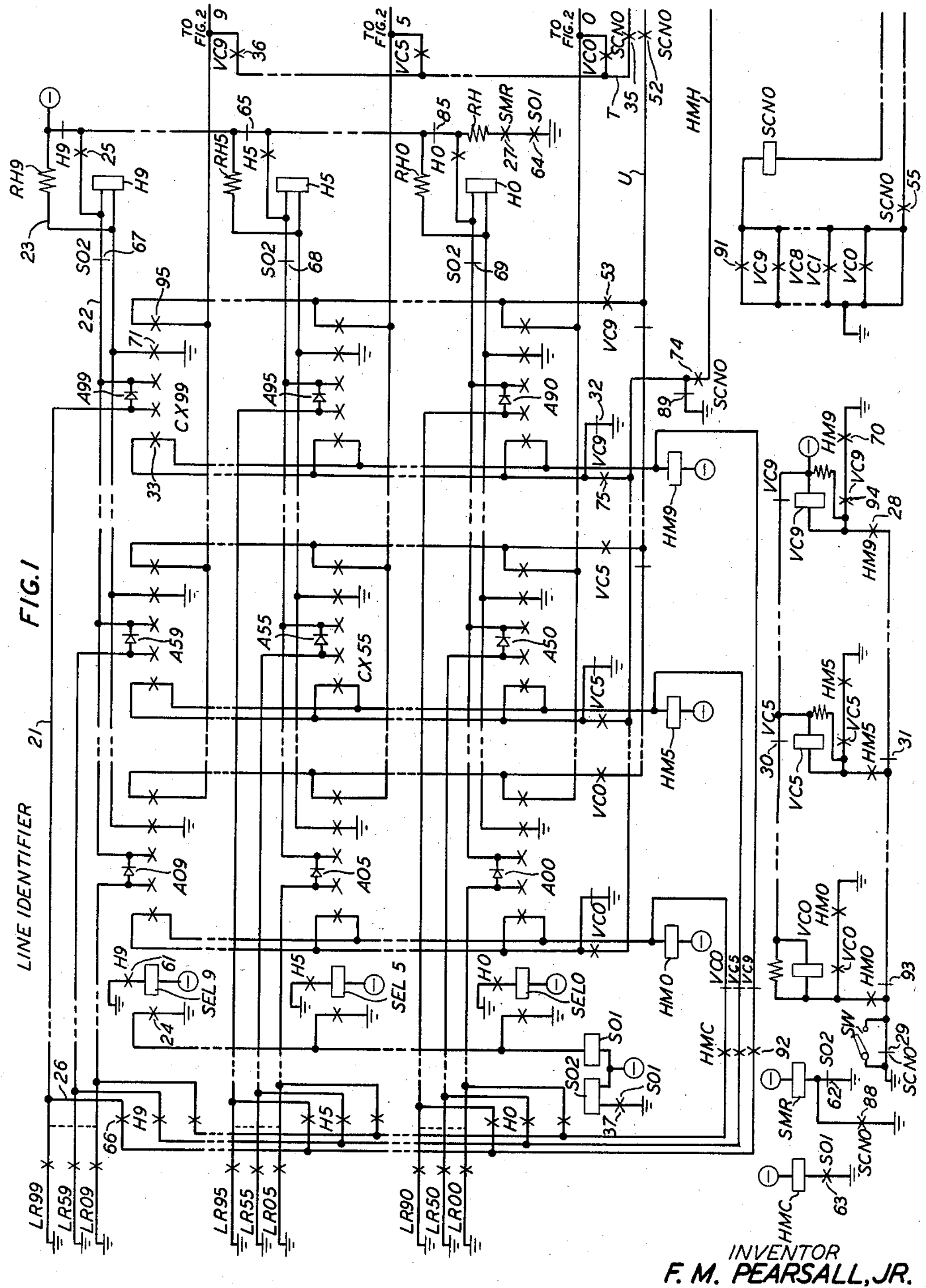
Fig. 1 represents in detached contact form a crossbar switch identifier and related circuitry.
Figure 2:
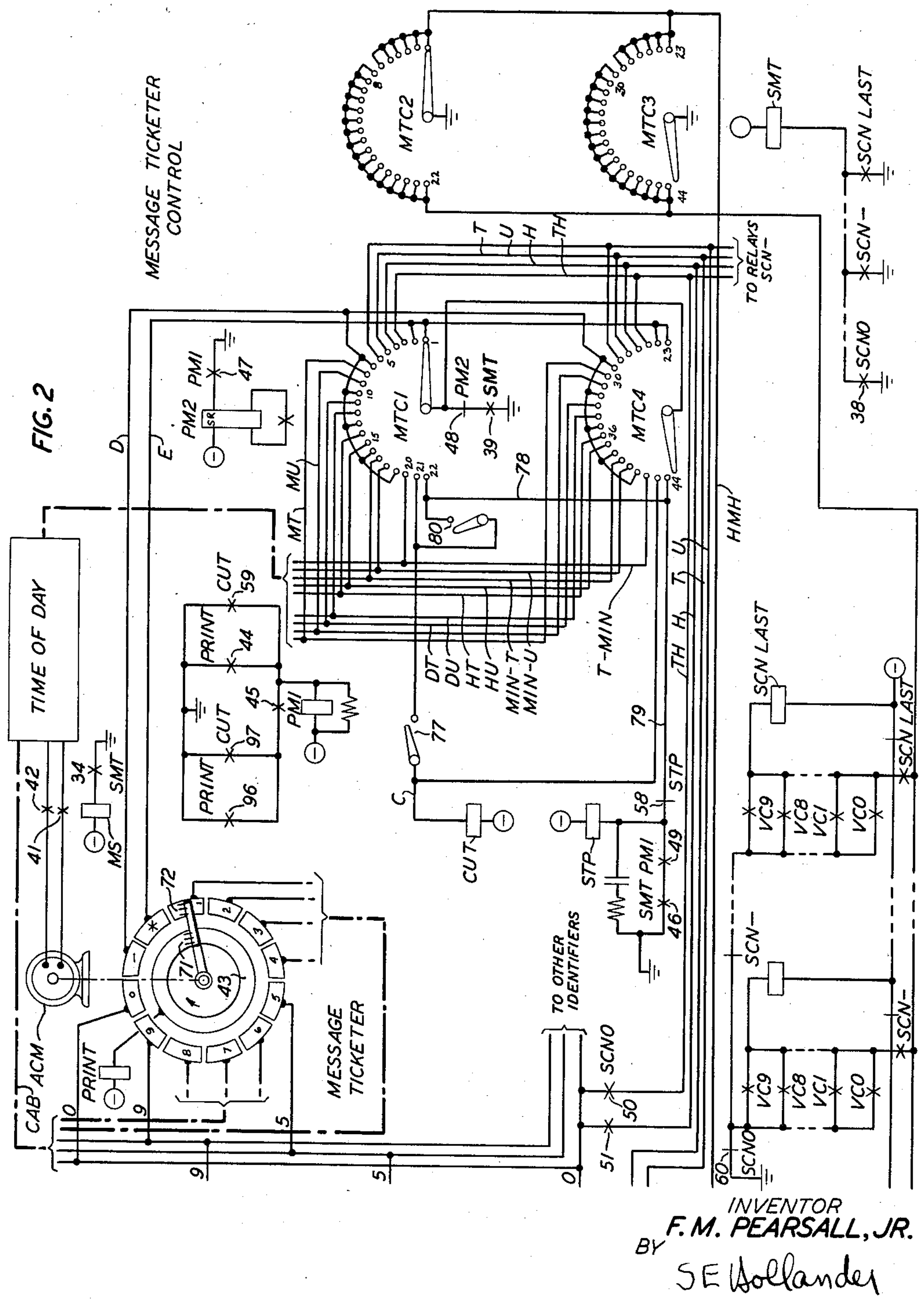
Fig. 2 shows, also in detached contact form, recordation and control equipment for recording the identification, established as in Fig. 1, and other pertinent information concerning a line requesting service.

It will be noted that Figs. 1 and 2 employ a type of notation referred to as "detached contact," in which a vertical bar represents normally closed contacts and an "X" represents normally open contacts, "normally" referring to the unoperated condition of a relay or other contact controlling device. For a complete exposition of this type of notation, reference may be made to an article entitled "Improved Detached Contact Circuit Drawing," by F. T. Meyer, vol. 74, Electrical Engineering, p. 645, August 1955.

Fig. 1 includes a line identifier which may be a crossbar switch of the general type exemplified in Patent 2,021,329, issued to J. N. Reynolds on November 19, 1955. Switches of this general type include groups of horizontal and vertical bars which are employed to actuate sets of contacts at the crosspoints of said bars. A flexible selecting finger is attached to each horizontal bar at each position where said bar is crossed by a vertical bar. Means are provided such that the rotation of a horizontal bar will cause the selecting fingers (not shown in Fig. 1) to move into a position where subsequent operation of a vertical bar will, due to the position of a displaced selecting finger, operate a card, causing a movable set of contacts to engage with a fixed set of contacts at the crosspoint of said two operated bars. The actuating magnets for the horizontal bars in Fig. 1 include relays SEL0, SEL5 and SEL9. Only three relays are shown, although the embodiment comprehends a crossbar switch having 100 crosspoints, requiring thereby, ten horizontal actuating magnets and ten vertical actuating magnets.

Similarly, the vertical actuating devices HM0, HM5 and HM9, although only three in number, are illustrative of the ten required in the embodiment. Relays H0 to H9 are individually associated with each horizontal level and are the first relays to operate in the functioning of the line identifier. Relays VC0 to VC9 are individually associated with each vertical file and are controlled by the associated hold magnets HM0 to HM9. A lockout chain including all of the relays VC– is arranged to prevent more than one relay VC– from operating at a particular time. This chain, in combination with the functioning of relays H– precludes the possibility of one particular line being processed for identification twice consecutively when other lines in the same switch are awaiting service, if the system includes only a single crossbar switch.

Line relays LR00 to LR99 (not shown but represented by normally open contacts LR00 to LR99 to the left of Fig. 1) are responsive to the energization of a line requesting service at a remote location. In the embodiment illustrated, it is contemplated that a particular line will be conditioned to an energized state by the lifting of a telephone instrument at the remote end of the line. Relay LR– remains energized, after operation, until an emergency service operator connects to the calling line for verbal communication or until the calling party disconnects.

The line identifier of Fig. 1 in conjunction with the message ticketer control of Fig. 2, and the time-of-day circuit serve to condition the message ticketer to print a ticket including a four-digit identification of the line requesting service and the time at which said service is requested.

Only one crossbar switch identifier is illustrated in Fig. 1, although the present invention includes the possibility of utilizing a multiplicity of identifier switches in conjunction with the message ticketer control and message ticketer of Fig. 2.

When a plurality of crossbar switch identifiers are employed, switch SW in Fig. 1 is opened, thereby removing the direct ground on the input to the chain of relays VC–. In this plural identifier switch arrangement relay SCN0, individual to the identifier switch of Fig. 1, must be in the released condition before any succeeding relay VC– in the same switch may operate, as will be explained herein.

The configuration of the circuit in plural identifier operation is so arranged that when a number of calls are waiting in the same switch, the calls associated with lower numbered vertical files will receive preference in recordation. A call waiting in a higher numbered vertical file will be processed only after the call in the lower file is answered.

In order to provide for uniform accessibility to the common control circuits of Fig. 2 with plural identifier operation, a lockout chain of relays SCN–, including an individual relay SCN– for each of the crossbar switch identifiers similar to that of Fig. 1, is shown. This chain of relays SCN– negatives the possibility of a single crossbar switch identifier having continued use of the common control facilities to the exclusion of other crossbar switch identifiers.

The message ticketer control of Fig. 2 includes a plurality of sequence switches MTC1, MTC2, MTC3 and MTC4, the brush selector arms of which are stepped under the control of relay STP. The functional relationships of the identifier, message ticketer control and time-of-day circuit in operating to print desired information by controlling the message ticketer will be fully explained herein. After information representing the identity of a line requesting service and the time said service request is recorded, a separate ticket may be cut through the operation of relay CUT or, alternatively, an additional item of similar information may be printed and then the ticket cut by operation of relay CUT.

Figure 3:
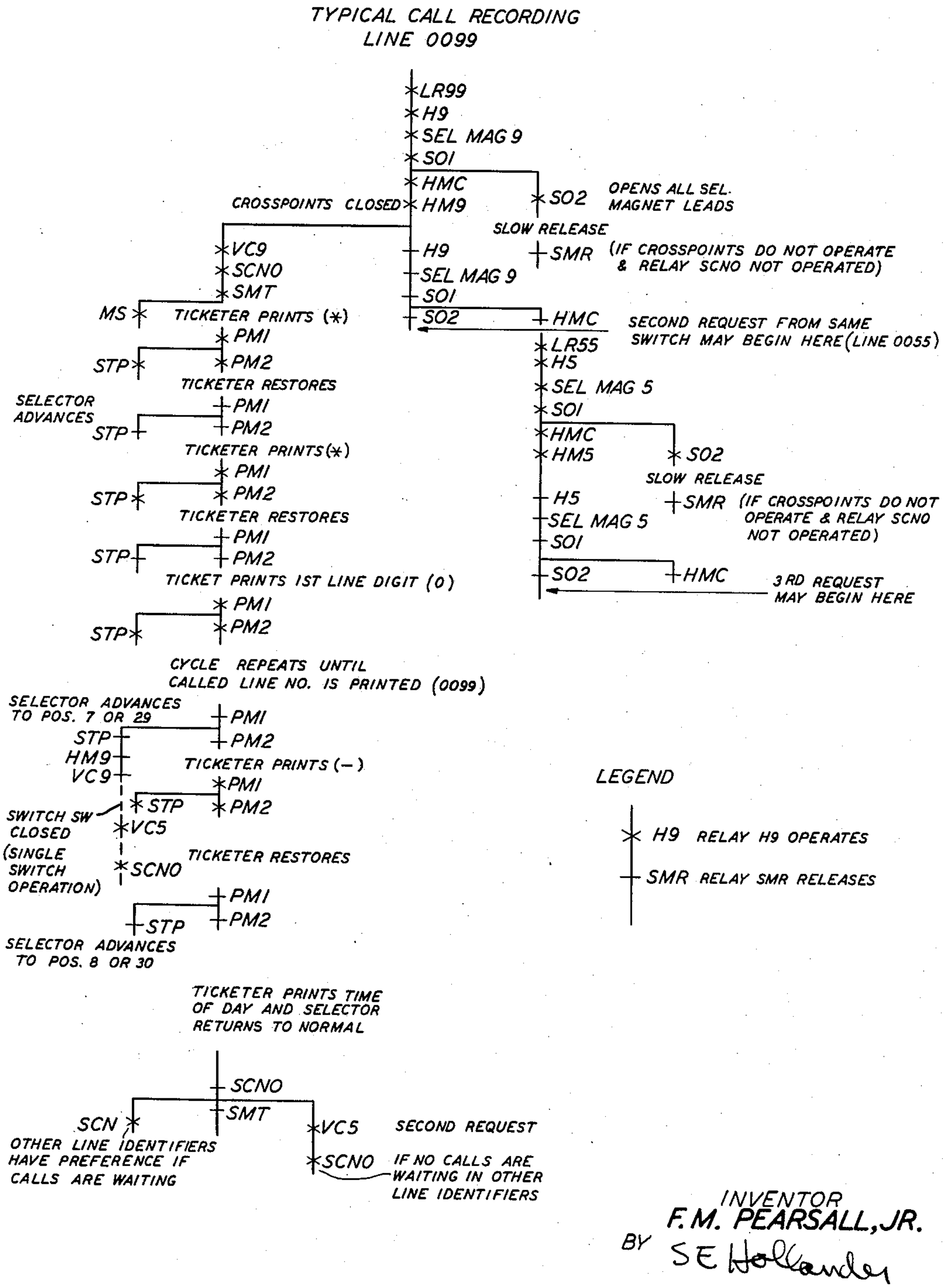
Fig. 3 is a sequence chart illustrating the time sequence of relay operations in typical instances of call identification and recording.

Understanding of the following description will be facilitated by reference to Fig. 3 which outlines chronologically the operation and release of the relays involved.

*Detailed description*

Referring now to Fig. 1, the line identifier includes a crossbar switch having one hundred crosspoint contact sets in ten horizontal and vertical levels, of which only three levels and nine sets of crosspoint contacts are shown.

It may be assumed for the purpose of illustration that line relay LR99 is energized in response to a signal requesting service at a remote location. A circuit may be traced from ground through the operated contacts of relay LR99, lead 21, varistor A99, lead 22, contacts 67 of relay SO2, operating winding of relay H9, conductor 23, resistance RH9 to negative battery. Relay H9 is thereby operated. It may be noted that the diodes A09, A59, etc., prevent interference between leads connected to the contacts on line relays LR–.

Operation of relay H9 causes the operation of the appropriate selector magnet SEL9 and horizontal bar. The operating path therefor, extends from ground through the contacts 61 of relay H9, operating winding of select magnet SEL9 to negative battery. When select magnet SEL9 operates, its off-normal contacts 24 complete a path for the operation of relay SO1 over an obvious circuit.

The operation of relay SO1 results in the operation of relays SO2 and HMC and in addition provides a holding ground for relay H9, from ground, contacts 64 of relay SO1, contacts 27 of relay SMR (operated until relay SO2 operates), resistance RH, contacts 85 of relay H0, contacts 65 of relay H5, contacts 25 of relay H9, winding of relay H9, conductor 23, resistance RH9 to negative battery.

The energizing circuit of relay SO2 may be traced from ground, contacts 37 of relay SO1, winding of relay SO2 to negative battery. Relay SMR, normally operated over a path from ground, normally closed contacts 62 of relay SO2, and operating winding of relay SMR to negative battery, begins to release as a result of the operation of relay SO2. A path for the operation of relay HMC extends from ground, contacts 63 of relay SO1, winding of relay HMC to negative battery.

The operation of relay SO2 prepares a circuit for opening all of the operating paths to the relays H– from the contacts on the associated line relays LR–. These operating paths are opened at contacts 67, 68 and 69 of relay SO2 to insure that no other relay H– will operate during the time that further connections for relay H9 are completed.

Actuation of relay HMC completes a circuit to operate hold magnet HM9, which circuit extends from ground, contacts of relay LR99, conductor 26, contacts 66 of relay H9, contacts 92 of relay HMC, contacts of relay VC9, operating winding of relay HM9 to negative battery. Hold magnet HM9, in operating, completes the closure of the crosspoint contacts located at the intersection of the vertical bar operated by hold magnet HM9 and the select bar operated by select magnet SEL9. A holding path for hold magnet HM9 extends from ground, contacts 32 of relay VC9, contacts 33 of crosspoint CX99 to the winding of magnet HM9 and negative battery.

If it is assumed that, for some reason, a hold magnet has failed to operate as a result of the opening of the line relay contacts LR– in the interval between the operation of a relay H– and a hold magnet HM–, means including relay SMR have been provided to insure that the switch will not be locked "off-normal." In such an instance, relay SMR, a slow release relay, the release of which commenced at the time of the operation of relay SO2, as described above, will by opening its contacts 27 ultimately interrupt the holding ground of the particular relay H– which has been operated.

Operation of hold magnet HM9, and particularly the closure of its associated off-normal springs 28, causes the operation of relay VC9 over a path which may be traced from ground, contacts 29 of relay SCN0, contacts 93 of relay HM0, contacts 31 of relay HM5, contacts 28 of relay HM9, winding of relay VC9 to negative battery. A locking path may be traced for relay VC9 from ground, through off-normal contacts 70 of relay HM9, contacts 94 of relay VC9, winding of relay VC9 to negative battery.

In this illustration, it is assumed that a plurality of line identifier switches similar to that shown in Fig. 1 are being used in conjunction with the control and recording equipment of Fig. 2. Switch SW is in the open position, therefore, in order that the contacts 29 of relay SCN0, released, are in series with the operating path of the relays VC–, thereby establishing equal accessibility of each identifier to the common recording equipment of Fig. 2, by virtue of the chain of relays SCN– of Figs. 1 and 2. This feature will be more fully explained herein.

The relays VC– are arranged in lockout paths which prevent the operation of more than one relay VC– at a time. The configuration is such that the operation of any associated pair of relays VC– and HM– will open the normally closed contacts in the upper and lower legs of the lockout path, for example, contacts 30 of relay VC5 and 31 of relay HM5, thus preventing the operation of any other relay in the chain.

Closure of the contacts at the crosspoint generally designated CX99 completes a circuit for shunt releasing of relay H9. This circuit may be traced from ground through contacts 71 of crosspoint CX99 to the lower side of the winding of relay H9. The upper side of the winding of relay H9 has already been traced to ground potential over the holding circuit. In consequence of the ground potential applied to both sides of the relay winding, relay H9 releases. At this time the holding ground for hold magnet HM9 may be traced from ground, through contacts 89 of relay SCN0, contacts 75 of relay VC9, contacts 33 of crosspoint CX99, over an obvious circuit to the winding of relay HM9 and negative battery.

In operating, crosspoint CX99 closes its contacts 95, preparing a path to the units lead U to the message ticketer control, which path is still incomplete as a result of the normally open contacts 52 of relay SCN0. This path extends from contacts 52 of relay SCN0, contacts 53 of relay VC9, contacts 95 of crosspoint CX99 to lead 9 to the message ticketer of Fig. 2.

The operation of relay VC9, discussed above, prepares a path, in part, for the energization of the tens lead T to the message ticketer circuit. This path may be traced from the normally open contacts 35 of relay SCN0, contacts 36 of relay VC9 to lead 9 to the message ticketer circuit.

As a result of the actuation of relay VC9, the relay SCN0 is operated over a circuit from ground, contacts 91 of relay VC9, operating winding of relay SCN0 through the normally closed contacts of other relays SCN– (Fig. 2) in other identifiers, to negative battery. The relays SCN– are in a chain which, along with its lockout circuit, is similar to that of relays VC–, above described.

As a result of the release of relay H9, previously described, select magnet SEL9 releases in consequence of the opening of contacts 61 of relay H9. Off-normal springs 24 of select magnet SEL9, in opening, interrupt the operating path for relay SO1, which now releases. The release of relay SO1 results in the release of relay SO2 through the opening of contacts 37 of relay SO1. In addition, the opening of contacts 63 of relay SO1 releases relay HMC. Relay SO2, in releasing, through its contacts 67, 68 and 69, closes the operating paths to the relays H– and in addition reestablishes the operating ground for relay SMR, which relay is designed to remain physically operated during the sequences described above.

The circuit is now in a condition to receive another call indication. As a result of a subsequent emergency service request, indicated by operation of line relay LR55, for example, the identifier will operate to the point where the associated crosspoint contacts have closed. The relay VC5, associated with the operated crosspoint, will not operate, however, until the previously operated relay VC9 releases, in consequence of the lockout path described above. In all other respects the operating sequence is similar to that described for line relay LR99, as may be noted from Fig. 3.

It may now be seen that by shunting down relay H9 for the length of time that the crosspoints are closed, other calls may be initiated, thereby operating their respective relays H– and subsequently closing the associated crosspoints until the time that the corresponding relay VC– would operate, which relay is locked out, as described for relay VC5 above. With this feature, waiting time for the registration of simultaneous calls appearing in other horizontal and vertical levels is reduced to a minimum.

Continuing the description of the effects of operation of relay SCN0, it is apparent that a path for the operation of relay SMT is completed, from ground (Fig. 2), contacts 38 of relay SCN0, operating winding of relay SMT to negative battery. Relay MS is operated as a result of the closure of contacts 34 of relay SMT, and, through the closure of its contacts 41 and 42, provides an operating path for motor ACM of the message ticketer, from a power source in the time-of-day circuit (not shown). The message ticketer is shown in Fig. 2 in abbreviated form only; for a complete disclosure thereof, an examination may be made of Patent No. 2,558,477 to J. W. Gooderham, A. E. Hague and A. C. Powell on June 26, 1951, and Patent No. 2,447,533 to J. B. Retallack on August 24, 1948, which are herewith incorporated by reference.

In addition, relay SMT in operating, provides a ground through contacts 39 of relay SMT, contacts 48 of relay PM2, brush contacts of selector MTC1, terminal 1 of selector MTC1, lead E to the asterisk (*) commutator segment in the message ticketer. The ticketer motor ACM; in operating, causes the brushes 71 and 72 to rotate and seek out the grounded commutator segment. When the brush 72 finds the grounded asterisk (*) commutator segment, a clutch release mechanism (not shown) disengages, stopping the brushes with the character to be printed centered over the print mechanism. As a result, magnet PRINT operates over the circuit which was previously traced from ground to the asterisk (*) commutator segment, brushes 72 and 71 of the message ticketer, common segment 43 of the message ticketer and the winding of relay PRINT to negative battery. Operation of relay PRINT closes the circuit from ground through contacts 44 of relay PRINT and the winding of relay PM1 to negative battery. A locking path for relay PM1 is provided through contacts 45 of relay PM1 and 96 of relay PRINT to ground.

Relay PM1, in operating, closes an operating circuit for the step magnet STP of selector switches MTC1–4 and also closes an operating path for relay PM2. The operating circuit for step magnet STP of switches MTC1–4 extends from ground, contact 46 of relay SMT, contacts 49 of relay PM1, winding of relay STP to negative battery. The operating path for relay PM2 may be traced from ground through contacts 47 of relay PM1, winding of relay PM2 to negative battery.

Actuation of relay PM2 removes the operating ground from relay PRINT by the opening of contacts 48 of relay PM2. Relay PRINT is thus released and in turn releases relay PM1 by opening the holding ground for this relay at contacts 96 of relay PRINT. Release of relay PM1 opens the operating circuit for step magnet STP through the opening of contacts 49 of relay PM1. In releasing, step magnet STP advances each of the selector brushes of selector switches MTC1–4 in a counterclockwise direction through an arc equal to $1/44$ of the circumference of travel. Moreover, the release of relay PM1 causes the release of relay PM2 through the opening of contacts 47 of relay PM1. Relay PM2 is a slow release relay, however, to insure that the switch has stepped to the next arc position before the commutator segment lead E is again grounded.

With selector MTC1 in position 2 the same sequence of events occurs as previously described with reference to position 1 and a second asterisk (*) is printed. As described above, the selector MTC1 steps to terminal 3 in the manner described for the stepping from position 1 to 2.

With the selector MTC1 in position 3, a ground condition is transmitted over lead TH, contacts 50 of relay SCN0 and lead 0 to the message ticketer. Grounding of this commutator segment performs the same function as previously described for the asterisk (*) segment of the commutator, i.e., the rotary motion of the brushes 71 and 72 will be stopped adjacent to commutator segment 0 to print the number 0 on the message ticketer tape.

It is assumed, here, that the identifier switch of Fig. 1 is designated 00 thereby determining the thousands and hundreds designation of the line requesting service. Since crosspoint 99 in switch 00 is assumed to have been closed, the complete identification of the line is 0099. Other switches will, of course, have different designations in the thousands and hundreds positions.

The advancement of selector MTC1 progresses, as previously described, to position 4. In position 4 the hundreds designation is recorded over lead H, contacts 51 of relay SCN0 to (in the assumed example) lead 0 to the message ticketer and finally to commutator segment 0. Grounding of commutator segment 0 occasions the same sequence of operations as previously described for the thousands lead TH. After completion of the printing of the hundreds digit 0, the selector MTC1 steps to position 5. In this position the ground circuit previously traced now extends to the line identifier circuit over lead T, contacts 35 of relay SCN0, contacts 36 of relay VC9 to lead 9 and commutator segment 9. The printing functions are performed as before and upon completion of the printing of tens digit 9, selector MTC1 steps to position 6, thereby completing a path through lead U to the line identifier, contacts 52 of relay SCN0, contacts 53 of relay VC9, contacts 95 of crosspoint CX99 to lead 9 to the message ticketer and commutator segment 9. After the printing of units digit 9, selector MTC1 steps to position 7.

In position 7, selector MTC2 provides a holding ground circuit for relay SCN0 which may be traced (in Fig. 2) from ground on brush contacts of selector MTC2, terminal 7 of selector MTC2, contacts 55 of relay SCN0 Fig. 1, winding of relay SCN0, normally closed contacts of relays SCN– to negative battery. This operation is completed prior to the removal of the operating ground for relay SCN0 furnished through contacts 91 of relay VC9 which will release, as explained herein.

Stepping to position 7 also interrupts the ground which previously extended from the brush contacts of selector MTC2, terminals 1–6 of selector MTC2, lead HMH, contacts 74 of relay SCN0, contacts 75 of relay VC9, contact 33 of crosspoint CX99 to hold magnet HM9 and negative battery. Hold magnet HM9 releases, thereby releasing relay VC9 through the opening of contacts 70 of relay HM9. Crosspoint CX99 is released when hold magnet HM9 returns to normal.

In position 7, selector MTC1 provides a ground traced from contacts 39 to relay SMT, contacts 48 of relay PM2 through the brush of selector MTC1, position 7, lead D to the dash (—) commutator segment. Grounding of commutator segment dash (—) performs the functions previously described for other commutator segments and a dash (—) is printed in the ticket position now located under the type. After completion of the printing of this character on the message ticket, the selector steps to position 8.

While in position 8, selector MTC1 provides a ground to lead MT to the time-of-day circuit. This circuit may be traced from ground, contacts 39 of relay SMT, contacts 48 of relay PM2, brush arm of selector MTC1, position 8, to lead MT to the time-of-day circuit. The time-of-day circuit is shown in Fig. 2 in symbolic form only; reference may be made to Patent No. 2,355,903 to F. E. Blount on August 15, 1944, for a complete exposition of a suitable circuit arrangement for use as the time-of-day circuit in conjunction with the present invention.

In a manner similar to that described above for the line identification, the time-of-day circuit functions to record the tens digit of the month in response to the grounding of the lead MT by grounding the appropriate commutator segment through cable CAB, etc. Subsequently, the selector steps to position 9 and the month units digit is printed in response to the grounding of lead MU. In succession thereafter a dash (—), tens digit of the day, units digit of the day, dash (—), tens digit of the hour, units digit of the hour, dash (—), tens digit of the minute, units digit of the minute, dash (—) and tenths of minute characters are printed on the ticket, thereby establishing a complete record to mark the time when the request was originated.

After completion of printing of the tenths of minute digit, selector MTC1 steps to terminal 21 where it may optionally place a ground on lead C (if switch 77 is closed and switch 80 open) thereby operating relay CUT over an obvious circuit or alternatively (if switch 80 is closed and 77 is open) it may step to position 22 by means of a self-interrupting circuit for the step magnet STP of selectors MTC1–4. This latter circuit may be traced from ground, contacts 39 of relay SMT, contacts 48 of relay PM2, brush of selector MTC1, terminal 21 of said selector, switch 80, lead 78, lead 79, contacts 58 of step magnet STP, to the winding of step magnet STP. The step magnet is operated, whereupon contacts 58 are opened and the step magnet releases, thereby stepping the switch to terminal 22.

If the first alternative circuit is utilized and lead C to relay CUT is grounded, the cutting magnet operates and activates a cutting blade (not shown) to cut the ticket. Contacts 59 and 97 of relay CUT complete a path to operate and hold relay PM1, thereby to indicate that the ticket has been cut and to step selector MTC1 to position 22.

If the second alternative circuit is employed and the selector is stepped to position 22, the same self-interrupting path previously described will result in stepping to position 23 which represents the first terminal on selectors MTC3 and MTC4. The operation of selector MTC4 and associated relay equipment in proceeding from terminals 23 to 44 is the same as that described for terminals 1 to 22 for selector MTC1 with the exception of the two alternative circuit practices described above.

When selector MTC2 steps from position 22, it removes the holding ground from relay SCN0 in the line identifier circuit, which latter relay releases.

It will be noted that contacts 88 of relay SCN0 (Fig. 1) provide a holding path for relay SMR to prevent release of said relay when a second call appears in the same vertical file as a call in process. In such event, the sequence of relay operations proceeds to the point where the horizontal bar has been actuated and then stops. When the vertical bar later releases, it will immediately be reoperated thereby reducing the time needed for recordation of the call waiting in the same vertical file.

Release of relay SCN0 provides an operating path for any other relays SCN– (Fig. 2) associated with any other switch in which a call may await identification. This path may be traced from ground through contacts 60 of relay SCN0 through the normally open contacts of relay VC– now operated, operating winding of relay SCN– through the normally closed contacts of other relays SCN– to negative battery. It will be noted that relay SCN0, in releasing (at contacts 29, Fig. 1) provides an operating path for other relays VC– associated with the same switch if calls are awaiting identification in the same switch. However, relay operate times are designed in order that the operation of any relay SCN– in any other switch awaiting processing will occur prior to the operation of a relay VC– in the switch just processed. Thus the chain of relays SCN– is effective to insure that no switch may preempt the ticketer twice successively at a time when calls are waiting in other switches which have access to the same ticketer.

In a system including 100, or fewer, lines to be identified, wherein only one identifier is used, switch SW of Fig. 1 may be closed. Under these conditions, a relay VC– associated with a line requesting service will operate immediately upon the release of the previous relay VC– in lieu of the release of relay SCN0 as in the above operation. Fig. 3 shows in dotted outline the relay sequence as between relays VC9 and VC5 when switch SW is closed. This arrangement provides uniform accessibility to the recording equipment for calls waiting in different vertical files in the same switch, in lieu of the preference accorded the lower numbered vertical files in plural switch operation as discussed previously.

It may be seen from the configuration of relay VC–, that with switch SW closed, calls awaiting identification in the switch will be recorded a maximum of once in every two operations of the recorder, independent of the time required to verbally answer the call and thereby release the associated relay LR–. This follows since, upon release, a relay VC–, associated with a call in process, cannot effectively compete with the relay VC– of a call awaiting recording since the relays VC– are slow release relays by virtue of the shunt resistance connected thereto. This slow release feature also insures the elapse of a sufficient interval to allow damping of a released crossbar selecting finger thereby preventing spurious connections when the same hold magnet is reoperated.

It is understood that the embodiments shown are merely exemplary and that various modifications will be apparent to those skilled in the art without departing from the scope of the present invention.

What is claimed is:

1. An emergency reporting alarm system including a crossbar switch identifier, recording means connected to said identifier, a plurality of lines connected to said identifier, said identifier being operative in response to the energization of one of said lines to close particular crosspoint contacts on said crossbar switch, control means connected to said recording means responsive to the closure of said crosspoint contacts to initiate the operation of said recorder for printing a record including the identification of said line, and means in said identifier for limiting the frequency of recording the identification of said line to one in every two operations of said recorder when a number of lines are energized simultaneously.

2. An emergency reporting alarm system including a crossbar switch identifier, recording means connected to said identifier, a plurality of lines connected to said identifier, said identifier being operative in response to the energization of one of said lines to close particular crosspoints on said crossbar switch, sequence switches connected to said recording means responsive to the closure of said crosspoint contacts to initiate the operation of said recording means for printing a record including the identification of said line, and means in said identifier for closing a plurality of crosspoints equal in number to the number of lines simultaneously energized for successive recording of the identification of said lines by said recording means.

3. An emergency telephone system including a crossbar switch identifier having horizontal and vertical intersecting bars and crosspoint contacts located at the intersections of said bars, recording means connected to said identifier, a plurality of lines individually connected to the crosspoints of said identifier, said identifier being operative in response to the energization of one of said lines to close particular crosspoint contacts on said crossbar switch, control means connected to said recording means responsive to the closure of said crosspoint contacts to initiate the operation of said recorder for printing a record including the identification of said line, means connected to said identifier for simultaneously operating a plurality of crosspoint contacts equal in number to the lines simultaneously energized, and means in said identifier for limiting the frequency of recording of the identification of one of said lines to one in every two operations of said recorder when a number of lines are energized simultaneously.

4. An emergency reporting alarm system including a crossbar switch identifier having horizontal and vertical bars and crosspoint contacts at the intersections of said bars, ticket printing means connected to said identifier, a plurality of lines individually connected to the crosspoint contacts of said identifier, said identifier being operative in response to the energization of one of said lines to close particular crosspoint contacts on said crossbar switch, sequence switches connected to said ticket printing means and responsive to the closure of said crosspoint contacts to initiate the operation of said ticket printing means for printing a ticket including the identification of said line, means in said identifier for temporarily storing the identification of a plurality of lines requesting service substantially simultaneously, and means connected to said identifier for limiting the frequency of recording the identification of said line to one in every two operations of said ticket printing means when a number of lines are simultaneously energized.

5. An emergency reporting alarm system including a crossbar switch identifier having horizontal and vertical bars, means for actuating said bars, and crosspoint contacts at the intersections of said bars; recording means connected to said identifier, a plurality of lines individually connected to the crosspoint contacts of said identifier, said identifier being operative in response to the energization of one of said lines to close particular crosspoint contacts on said crossbar switch, sequence switches connected to said recording means and responsive to the closure of said crosspoint contacts to initiate the operation of said recording means for printing a ticket including the identification of said line, means in said identifier for temporarily storing the identification of a plurality of lines requesting service substantially simultaneously, and relay means connected to said vertical bar actuating means for limiting the frequency of recording the identification of any one of said lines to one in every two operations of said recording means when a number of lines are simultaneously energized.

6. An emergency telephone reporting alarm system including a crossbar switch identifier, recording means connected to said identifier, a plurality of lines individually connected to the crosspoints of said identifier, said identifier being operative in response to the energization of one of said lines to close particular crosspoint contacts on said crossbar switch, control means connected to said recording means responsive to the closure of said crosspoint contacts to initiate the operation of said recorder for printing a record including the identification of said line, means in said crossbar switch identifier for storing the identification of a number of said plurality of lines requesting service wherein said number of lines requesting service are all connected to different horizontal and vertical levels, first relay means individual to each of said horizontal levels and operated in response to the energization of said lines, means for releasing said first relay means when the crosspoint contacts connected to one of said lines fail to close within a predetermined interval after the energization of said line, and second relay means in said identifier for limiting the frequency of recording the identification of any one of said lines to one in every two operations of said recorder when a number of lines are energized substantially simultaneously.

7. An emergency reporting alarm system including a crossbar switch identifier having horizontal and vertical bars and separately operable contact sets at each intersecting point of said bars, a plurality of calling lines individually connected to said contact sets, means for actuating said horizontal and vertical bars to operate a particular contact set at the crosspoint of said bars, means connecting each of said calling lines to said actuating means, first relay means individual to each horizontal level of contact sets in said crossbar switch and energizable for controlling said actuating means, recording means connected to said identifier, said identifier being operative in response to the energization of one of said lines and of said first relay means to close particular crosspoint contacts on said crossbar switch, control means connected to said recording means responsive to the closure of said crosspoint contacts to initiate the operation of said recording means for printing a record including the identification of said line, and second relay means in said identifier for limiting the frequency of recording the identification of said line to one in every two operations of said recorder when a number of lines are simultaneously energized.

8. An emergency telephone reporting alarm system including a crossbar switch identifier having horizontal and vertical bars and separately operable contact sets at the intersecting points of said bars, a plurality of calling lines individually connected to said contact sets, means for actuating said horizontal and vertical bars, means connecting each of said calling lines to said actuating means, first relay means individual to each horizontal level of cross-point contacts and energizable for controlling the operation of said actuating means, recording means and timing means connected to said identifier, said identifier being operative in response to the energization of one of said lines and of said first relay means to close particular crosspoint contacts on said crossbar switch, sequence switches connected to said recording means and responsive to the closure of said crosspoint contacts to initiate the operation of said recording means for producing a record including the identification of said one line and the time said identification was recorded, means in said identifier for storing the identification of a number of said plurality of lines on different horizontal and vertical levels, and second relay means connected to said actuating means for limiting the frequency of recording the identification of said one line to one in every two operations of said recorder when a number of lines are simultaneously energized.

9. An emergency reporting alarm system including a plurality of identifiers each comprising a crossbar switch, each of said crossbar switches having horizontal and vertical bars and separately operable contact sets at the intersecting points of said bars and horizontal bar actuating means and vertical bar actuating means, a plurality of calling lines individually connected to each of said contact sets and to said horizontal bar actuating means and vertical bar actuating means, first relay means connected to those of said plurality of calling lines on the same horizontal level and energizable for controlling the operation of said horizontal and vertical bar actuating means, recording means connectable to each of said crossbar switch identifiers, timing means connectable to each of said crossbar switch identifiers, said identifiers being operative in response to the energization of one of said lines and of said first relay means to close particular crosspoint contacts on said crossbar switches, sequence switches connected to said recording means and responsive to the closure of said crosspoint contacts to initiate the operation of said recording means for printing a record including the identification of said line and the time said identification is recorded, means in each of said identifiers for storing the identification of a plurality of lines requesting service substantially simultaneously, and second relay means connected to said recording means and to each of said identifiers for limiting the frequency of recording the identification of a line in any one of said identifiers to one in every two operations of said recording means when a number of lines are simultaneously energized in a plurality of identifiers.

10. An emergency telephone reporting alarm system including a plurality of crossbar switch identifiers, said identifiers having horizontal and vertical bars and separately operable contact sets at the crosspoints of said bars, means for actuating said horizontal bars, means for actuating said vertical bars, a plurality of calling lines individually connected to said crosspoint contacts and to said vertical bar actuating means and horizontal bar actuating means, first relay means connected to a plurality of calling lines on the same horizontal level and energizable for controlling the operation of said horizontal bar actuating means and said vertical bar actuating means, said identifiers being operative in response to the energization of one of said lines and of said first relay means to close particular crosspoint contacts on said crossbar switches, means for deenergizing said first relay means and said horizontal bar actuating means after the actuation of said vertical bar, recording means and timing means connectable to each of said crossbar switch identifiers, sequence switches connected to said recording means and responsive to the closure of said crosspoint contacts to initiate the operation of said recording means to print a record including the identification of said line and the time said identification is recorded, means connected to each of said identifiers and to said recording means for limiting the frequency of recording of the identification of energized lines in a particular switch when lines in other switches are energized and awaiting identification, and means individual to each of said crossbar switch identifiers for limiting the frequency of recording of a particular energized line to one in every two operations of said recording means when a number of lines in said particular crossbar switch identifier are substantially simultaneously energized.

11. An emergency telephone reporting alarm system including a crossbar switch identifier having horizontal and vertical bars, and separately operable contacts set at the intersecting points of said bars; a plurality of calling lines individually connected to said contact sets, means for actuating said horizontal and vertical bars, first relay means individual to each horizontal level of crosspoint contacts and energizable for controlling the operation of said actuating means, means connecting each of said calling lines to said actuating means and to said first relay means, recording means and timing means connected to said identifier, said identifier being operative in response to the energization of one of said lines and of said first relay means to close particular crosspoint contacts on said crossbar switch, means for deenergizing said first relay means when the crosspoint contacts connected to one of said lines fail to close within a predetermined interval after the energization of said line, sequence switches connected to said recording means and responsive to the closure of said crosspoint contacts to initiate the operation of said recording means for producing a record including the identification of said line and the time said identification was recorded, means in said identifier for storing the identification of a plurality of lines on different horizontal and vertical levels, and second relay means connected to said actuating means for limiting the frequency of recording the identification of said line, to one in every two operations of said recorder, when a number of lines are simultaneously energized.

12. An emergency reporting alarm system including a plurality of identifiers each comprising a crossbar switch, each of said crossbar switches having horizontal and vertical bars, means for actuating said horizontal and vertical bars, and separately operable contact sets at the intersecting points of said bars; a plurality of calling lines individually connected to each of said crosspoints and to said horizontal bar actuating means and vertical bar actuating means, first relay means connected to a plurality of calling lines on the same horizontal level and energizable for controlling the operation of said horizontal and vertical bar actuating means, recording means connectable to each of said crossbar switch identifiers, timing means connectable to each of said crossbar switch identifiers, said identifiers being operative in response to the energization of one of said lines and of said first relay means to close particular crosspoint contacts on said crossbar switches, means for deenergizing said first relay means when the crosspoint contacts connected to one of said lines fail to close within a predetermined interval after the energization of said line, sequence switches connected to said recording means and responsive to the closure of said crosspoint contacts to initiate the operation of said recording means for printing a record including the identification of said line and the time said identification is recorded, means in each of said identifiers for storing the identification of a plurality of lines requesting service substantially simultaneously, and second relay means connected to said recording means and to each of said identifiers for limiting the frequency of usage of said recording means by any one of said identifiers to one in every two operations of said recording means when a number of lines are simultaneously energized in a plurality of identifiers.

13. An emergency telephone reporting alarm system including a plurality of crossbar switch identifiers, said identifiers having horizontal and vertical bars, means operable for actuating said bars, and separately operable contact sets at the crosspoints of said bars; a plurality of calling lines individually connected to said crosspoint contacts and to said actuating means, first relay means connected to a plurality of calling lines on the same horizontal level and operable for controlling the operation of said actuating means, means for releasing said first relay means and said horizontal bar actuating means after the actuation of said vertical bar, additional means for releasing said first relay means when the crosspoint contacts connected to one of said lines fail to close within a predetermined time after the energization of said line, recording means and timing means connectable to each of said crossbar switch identifiers, sequence switches connected to said recording means and responsive to the closure of said crosspoint contacts to initiate the operation of said recording means for printing a record including the identification of said line and the time said identification is recorded, means in each of said identifiers for storing the identification of a plurality of lines requesting service substantially simultaneously, and means connected to each of said identifiers and to said recording means for limiting the frequency of recording of the identification of energized lines in a particular switch, when lines in other switches are energized and awaiting recording, to one in every two operations of said recording means.

References Cited in the file of this patent

UNITED STATES PATENTS 2,062,822 Powell ---------------- Dec. 1, 1936